United States Patent [19]

Berger et al.

[11] Patent Number: 5,227,445

[45] Date of Patent: Jul. 13, 1993

[54] ETHYLENE-VINYL ACETATE COPOLYMERS OF INCREASED SOLIDIFICATION POINT

[75] Inventors: Albin Berger, Ludwigshafen; Roger Klimesch, Alsbach-Haehnlein; Michael W. Mueller, Plankstadt; Klaus Boehlke, Hessheim; Volker Schwendemann, Neustadt; Franz G. Mietzner, Ludwigshafen, all of Fed. Rep. of Germany

[73] Assignee: BASF Aktiengesellschaft, Ludwigshafen, Fed. Rep. of Germany

[21] Appl. No.: 747,325

[22] Filed: Aug. 20, 1991

[30] Foreign Application Priority Data

Aug. 28, 1990 [DE] Fed. Rep. of Germany ....... 4027140

[51] Int. Cl.$^5$ ............................................. C08F 218/08
[52] U.S. Cl. .................................................. 526/331
[58] Field of Search ........................................ 526/331

[56] References Cited

U.S. PATENT DOCUMENTS

| 4,485,225 | 11/1984 | Satoh et al. | 526/331 |
| 4,497,941 | 2/1985 | Aliani et al. | 526/331 |
| 4,613,632 | 9/1986 | Aliani et al. | 526/331 |
| 4,649,186 | 3/1987 | Jenkins et al. | 526/331 |
| 4,657,994 | 4/1987 | Tanaka et al. | 526/331 |
| 4,794,004 | 12/1988 | Pfleger et al. | 526/331 |
| 4,937,303 | 6/1990 | Wolf et al. | 526/331 |
| 5,041,482 | 8/1991 | Ornsteen et al. | 526/331 |

FOREIGN PATENT DOCUMENTS

| 2001233 | 7/1971 | Fed. Rep. of Germany | 526/331 |
| 47-51589 | 12/1972 | Japan | 526/331 |
| 59-215343 | 12/1984 | Japan | 526/331 |
| 0854937 | 8/1981 | U.S.S.R. | 526/331 |
| 915890 | 1/1963 | United Kingdom | 526/331 |
| 979522 | 1/1965 | United Kingdom . | |

Primary Examiner—Joseph L. Schofer
Assistant Examiner—N. Sarofim
Attorney, Agent, or Firm—Keil & Weinkauf

[57] ABSTRACT

Copolymers comprising
 from 75 to 92% by weight of ethylene and
 from 8 to 25% by weight of vinyl acetate
have a solidification point of greater than 87° C. and a melt viscosity of greater than 1,200 centistokes.

5 Claims, No Drawings

ETHYLENE-VINYL ACETATE COPOLYMERS OF INCREASED SOLIDIFICATION POINT

The present invention relates to copolymers comprising from 75 to 92% by weight of ethylene and
from 8 to 25% by weight of vinyl acetate and having a solidification point of greater than 87° C. and a melt viscosity of greater than 1,200 centistokes.

The present invention also relates to a process for the preparation of products of this type.

Ethylene-vinyl acetate copolymers having a broad range of vinyl acetate contents have many applications.

An important property for certain applications is the solidification point, which should be as high as possible.

In general, the solidification point decreases with increasing vinyl acetate content. For this reason, it has hitherto not been possible to satisfactorily achieve a combination of high solidification point and high vinyl acetate content.

It is therefore an object of the present invention to provide ethylene-vinyl acetate copolymers of high vinyl acetate content and high solidification point.

We have found that this object is achieved by the ethylene-vinyl acetate copolymers as claimed in claim 1.

The copolymers according to the invention are built up from 75 to 92% by weight, preferably from 78 to 90% by weight, in particular from 80 to 90% by weight, of units derived from ethylene and from 8 to 25% by weight, preferably from 10 to 22% by weight, in particular from 10 to 20% by weight, of units derived from vinyl acetate.

In addition, further monomers in amounts of up to 10% by weight may be copolymerized so long as this does not adversely affect the property profile of the products.

The molecular weight ($M_w$) of the copolymers according to the invention is generally in the range from 5,000 to 40,000, preferably from 6,000 to 30,000, in particular from 7,000 to 25,000.

The melt viscosity is greater than 1,200 centistokes (cst) and is generally in the range from 1,500 to 4,000 cst, in particular from 1,600 to 3,000 cst. The melt viscosity is determined in an Ubbelohde viscometer at 120° C.

The density of the copolymers depends, inter alia, on the content of copolymerized vinyl acetate and is generally in the range from 0.918 to 0.950 g/cm$^3$, preferably from 0.92 to 0.945 g/cm$^3$.

The molecular weight distribution is not crucial per se, but products having an $M_w/M_n$ ratio in the range from 2.0 to 4.5, in particular from 2.2 to 3.5, particularly preferably from 2.2 to 3.0, have proven advantageous for some applications.

The solidification point of the copolymers according to the invention is greater than 87° C., preferably in the range from 87.5° to 105° C., in particular in the range from 88.5° to 100° C. The solidification point is determined in accordance with DGF M-III 4a (63).

The copolymers according to the invention are prepared by the process according to the invention by high-pressure bulk polymerization at from 1,500 to 3,000 bar, preferably from 1,700 to 2,800 bar, in particular from 1,800 to 2,400 bar.

The reaction temperature is in the range from 180° to 240° C., preferably from 190° to 230° C., in particular from 200° to 225° C.

The residence time in the reactor is generally in the range from 0.3 to 5 minutes, preferably from 0.8 to 3.5 minutes, in particular from 1.0 to 2.5 minutes.

The reaction may be carried out in the presence of molecular weight regulators, such as hydrogen, aldehydes (preferably $C_1$-$C_4$-aldehydes) or hydrocarbons (preferably $C_3$-$C_8$) in order to target certain molecular weights. Corresponding processes are known to a person skilled in the art.

As is known, high-pressure bulk polymerization is a free radical-initiated reaction, i.e. is carried out in the presence of initiators which produce free radicals. Mention may be made here (merely as representatives) of, for example, diisopropyl peroxodicarbonate, tert-butyl perbenzoate, di-3,5,5-trimethylhexanoyl peroxide, tert-butyl perisononanoate and tert-butyl perpivalate, of which the last two initiators and mixtures thereof are preferred. However, the initiator type is generally not particularly crucial, and other initiators are therefore suitable so long as they have an appropriate thermal decomposition behavior.

The amount of initiator is generally in the range from 1 to 100 mol ppm, in particular from 2 to 80 mol ppm, particularly preferably from 2.5 to 60 mol ppm, based on ethylene (molar amount of initiator per mole of ethylene).

The process may be carried out in conventional equipment for high-pressure bulk polymerization, such as autoclaves and high-pressure tubular reactors. Suitable equipment is known to a person skilled in the art and is described in the literature, for example in Erdöl-Kohle-Erdgas (Science & Technology, Vol. 42 (1989), issue 4, pp. 149 ff).

The monomers can be fed to the reactor individually or collectively at one or more points.

In some cases, it has proven advantageous to use an apparatus comprising an autoclave reactor and a downstream tubular reactor, as described in DE-A 23 22 553.

The copolymers according to the invention can be worked up by conventional methods which are known to a person skilled in the art; further details are therefore superfluous. The polymers are usually discharged after decompression as powders or granules with the aid of a sprayer or pastillizer.

Due to their property profile, the copolymers according to the invention are particularly suitable as additives for paints of all types, in particular metallic automotive finishes and wood and metal paints, and for use in hot-melt adhesives.

They can also be used as additives for improving the properties of liquid fuels.

EXAMPLES

The amounts of ethylene, vinyl acetate and initiator given in the table were introduced into a 1 l autoclave and polymerized under the conditions given in the table.

After the reaction, the mixture was decompressed in a conventional manner, and the product was granulated using a granulation belt.

The solidification point, the melting point, the $M_w/M_n$ ratio and the melt viscosity of the product are also given in the table.

The following abbreviations are used in the table:

| | |
|---|---|
| E = | ethylene |
| VAC = | vinyl acetate |
| SP = | solidfication point |
| m.p. = | melting point |
| TBPP = | tert-butyl perpivalate |
| TBIN = | tert-butyl perisononanoate |

TABLE

| Experiment No. | E [kg/h] | VAC [kg/h] | Temp. °C. | Pressure bar[1] | Initiator mol ppm | SP °C. | m.p. °C. | Density g/cm³ | $M_w/M_n$ | Melt viscosity cst |
|---|---|---|---|---|---|---|---|---|---|---|
| 1C | 18.5 | 3.26 | 245 | 1,200 | 18.2 TBPP 36.3 TBIN | 75.5 | 83.5 | 0.9237 | 2.916 | 1,850 |
| 2C | 17.5 | 3.26 | 245 | 1,700 | 16.0 TBPP 32.0 TBIN | 79.5 | 85.9 | 0.9264 | 3.514 | 1,875 |
| 3C | 11.0 | 2.39 | 245 | 1,900 | 8.4 TBPP 16.8 TBIN | 79.5 | 84.7 | 0.9269 | 3.769 | 3,125 |
| 4 | 11.9 | 2.02 | 215 | 1,900 | 3.5 TBPP | 89.5 | 97.7 | 0.9381 | 2.403 | 1,880 |
| 5 | 11.6 | 1.75 | 200 | 1,900 | 3.3 TBPP | 92.0 | — | 0.9421 | 2.530 | 1,973 |
| 6 | 11.8 | 1.90 | 200 | 1,900 | 2.6 TBPP | 89.5 | — | 0.9429 | 2.348 | 1,972 |
| 7 | 9.6 | 1.43 | 215 | 2,100 | 10.9 TBPP | 88.5 | 97.6 | 0.9369 | 2.654 | 1,826 |
| 8 | 9.0 | 1.21 | 230 | 2,100 | 49.8 TBPP | 91.0 | 97.9 | 0.9345 | 2.532 | 2,104 |
| 9 | 8.8 | 1.35 | 230 | 2,100 | 47.8 TBPP | 89.5 | — | 0.9335 | — | 2,041 |
| 10 | 11.3 | 2.05 | 200 | 1,900 | 29.7 TBPP | 89.0 | 97.7 | 0.9411 | — | 1,936 |
| 11 | 8.5 | 1.13 | 200 | 2,100 | 5.8 TBPP | 96.5 | — | 0.9425 | — | 2,185 |

The vinyl acetate contents of the copolymers were as follows:

| Example | VAC content (% by weight) |
|---|---|
| 1C | 14.4 |
| 2C | 14.8 |
| 3C | 15.1 |
| 4 | 13.6 |
| 5 | 13.5 |
| 6 | 16.2 |
| 7 | 14.7 |
| 8 | 16.5 |
| 9 | 18.2 |
| 10 | 19.5 |
| 11 | 13.0 |

We claim:

1. A copolymer comprising from 75 to 92% be weight of ethylene and from 8 to 25% by weight of vinyl acetate and having a solidification point of greater than 85° C. and not above 105° C., a melt viscosity of greater than 1,200 centistohes, and a molecular weight (Mw) of from 5,000 to 40,000, which copolymer has been obtained by high-pressure bulk polymerization at from 1,500 to 3,000 bar and at from 180° to 240° C.

2. A process for the preparation of a copolymer as defined in claim 1 by high-pressure bulk polymerization, at from 1,500 to 3,000 bar and at from 180° to 240° C.

3. A process as defined in claim 2, wherein the polymerization is carried out in an autoclave or in an autoclave with downstream tubular reactor.

4. A process as defined in claim 3, wherein the total residence time is from 1.0 to 2.5 minutes.

5. A copolymer comprising
   from 80 to 90% by weight of ethylene and
   from 10 to 20% by weight of vinyl acetate
   and having a solidification point of from 88.5° to 100° C., a melt viscosity of from 1600 to 3000 centistokes and a molecular weight (Mw) of from 7,000 to 25,000.

* * * * *

UNITED STATES PATENT AND TRADEMARK OFFICE
CERTIFICATE OF CORRECTION

PATENT NO. : 5,227,445

DATED : July 13, 1993

INVENTOR(S) : BERGER et al.

It is certified that error appears in the above-identified patent and that said Letters Patent is hereby corrected as shown below:

Claim 1, column 4, line 6, "centistohes" should read --centistokes--.

Signed and Sealed this

Twenty-ninth Day of March, 1994

Attest:

BRUCE LEHMAN

*Attesting Officer*   *Commissioner of Patents and Trademarks*